INVENTOR
ARTHUR A. KOTTMANN

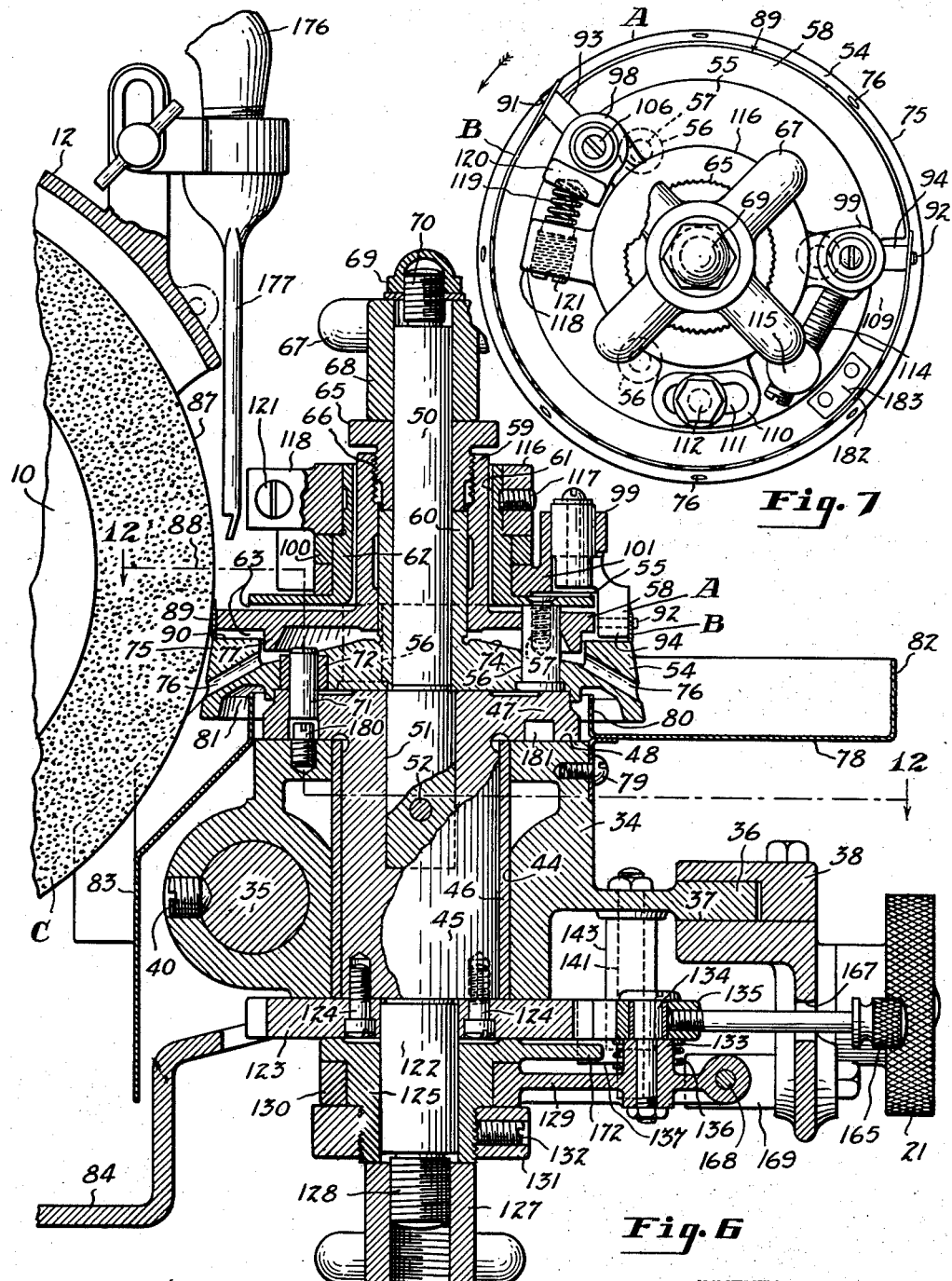

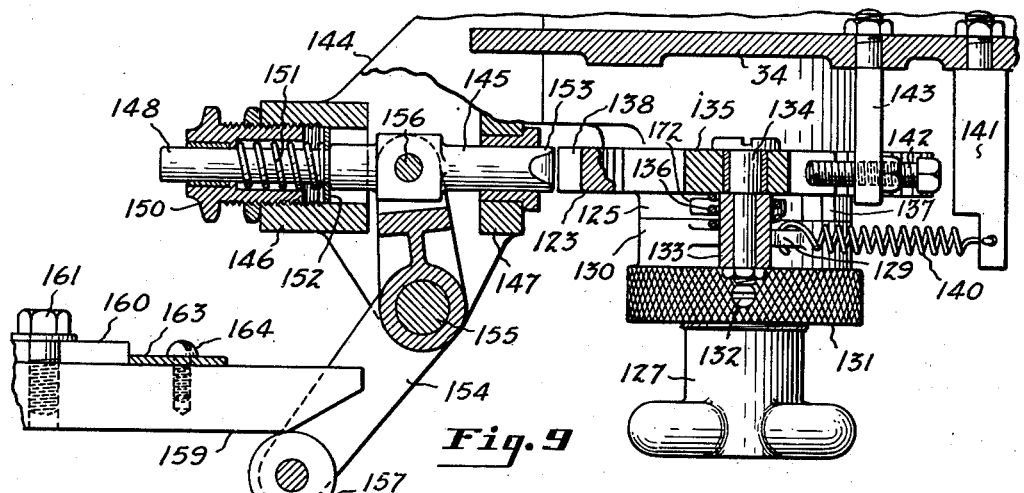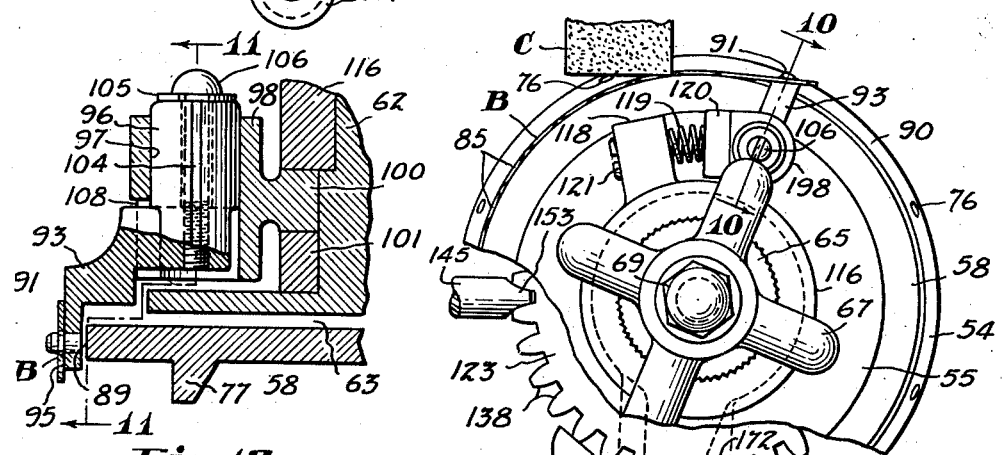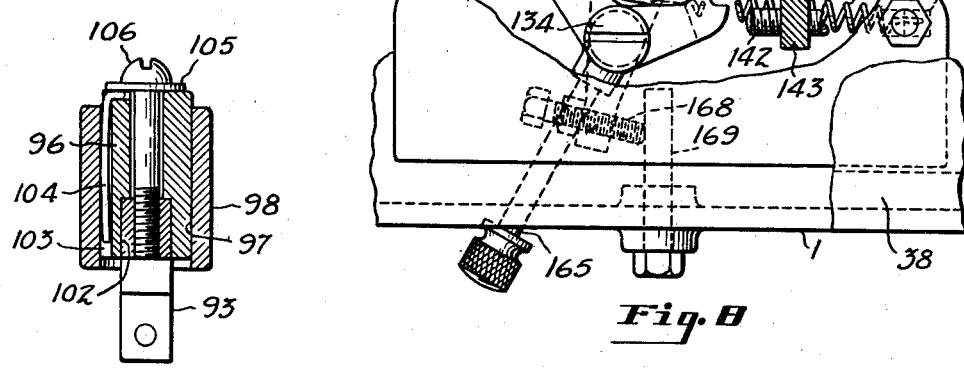

Aug. 19, 1941.  A. A. KOTTMANN  2,252,892
APPARATUS FOR HOLDING AND GRINDING FLEXIBLE BLADES
Filed Feb. 28, 1939  8 Sheets-Sheet 6

INVENTOR
ARTHUR A. KOTTMANN
BY Evans & McCoy
ATTORNEYS

INVENTOR
ARTHUR A. KOTTMANN
BY Evans McCoy
ATTORNEYS

INVENTOR
ARTHUR A. KOTTMANN
BY Evans & McCoy
ATTORNEYS

Patented Aug. 19, 1941

2,252,892

UNITED STATES PATENT OFFICE 2,252,892

APPARATUS FOR HOLDING AND GRINDING FLEXIBLE BLADES

Arthur A. Kottmann, Davenport, Iowa

Application February 28, 1939, Serial No. 258,919

47 Claims. (Cl. 51—92)

This invention relates to grinding machines and more particularly to a machine having a rotary wheel for grinding relatively thin elongated slicing blades while the latter are curved so as to grind in the cutting edges of such blades a succession of uniform serrations of scallops.

Since the advent of sliced baked goods, such as bread and the like, most commercial bakeries have adopted the use of mechanical slicing machines which use relatively thin flexible cutting knives or blades having a series of scallops or serrations formed along their cutting edges. Accordingly, it becomes desirable to provide a mechanism for quickly and economically grinding the scallops or serrations with a high degree of accuracy and precision. Furthermore, as a result of the heavy production schedules of many bakeries, the cutting knives or blades are apt to become dull in a relatively short period of time. Most of the blades, however, can be resharpened a number of times before they become too weak to withstand the tension imposed thereon during the slicing operation, and in order to avail themselves of the economy of resharpening the dull knives without returning such knives to the manufacturer, many bakeries prefer to install their own blade resharpening equipment.

On account of the variations in blade sizes, particularly as to width resulting from successive resharpenings or regrindings and because of the non-uniformity in the scallops or serrations of different blades, a machine which is designed for regrinding or sharpening one blade will not necessarily be suitable for regrinding another blade without considerable adjustment. It is, therefore, an object of the present invention to provide a grinding machine for thin flexible cutters which can be quickly and easily adjusted to accommodate blades of varying width with a minimum of inconvenience to the operator of the machine.

Another object is to provide a grinder of this type which is provided with simple adjustments for accommodating cutter blades having scallops or serrations of different configuration.

Another object is to provide a grinding machine which can be interchangeably used for initially grinding scallops or serrations on blade blanks, or for resharpening previously formed scallops, on blades of different size and scallop configurations. A more specific object is to provide in a grinding machine of the character mentioned an adjustable means for holding a curved blade and presenting successive portions thereof to the abrading surface of a rotating grinding wheel.

Another object is to provide an improved blade grinding machine having advantageous operating characteristics and ease of adjustment and adaptability which is simple in design and construction and relatively inexpensive to manufacture. Other objects and advantages will become apparent from the following detailed description of a suitable embodiment of the invention made in connection with the accompanying drawings, in which:

Fig. 6 is a vertical sectional detail, with parts removed, taken substantially on the line 6—6 of Fig. 1 and enlarged with respect thereto;

Fig. 7 is a plan view of the blade holder, with parts removed;

Fig. 8 is a fragmentary plan view of the blade holder and carriage, with parts removed, showing the ratcheting mechanism for rotating the blade holder;

Fig. 9 is a fragmentary sectional detail, with parts removed, showing the indexing mechanism;

Fig. 10 is a sectional detail taken substantially on the line 10—10 of Fig. 8 and enlarged with respect thereto;

Fig. 11 is a sectional detail taken substantially on the line 11—11 of Fig. 10;

Figure 1:
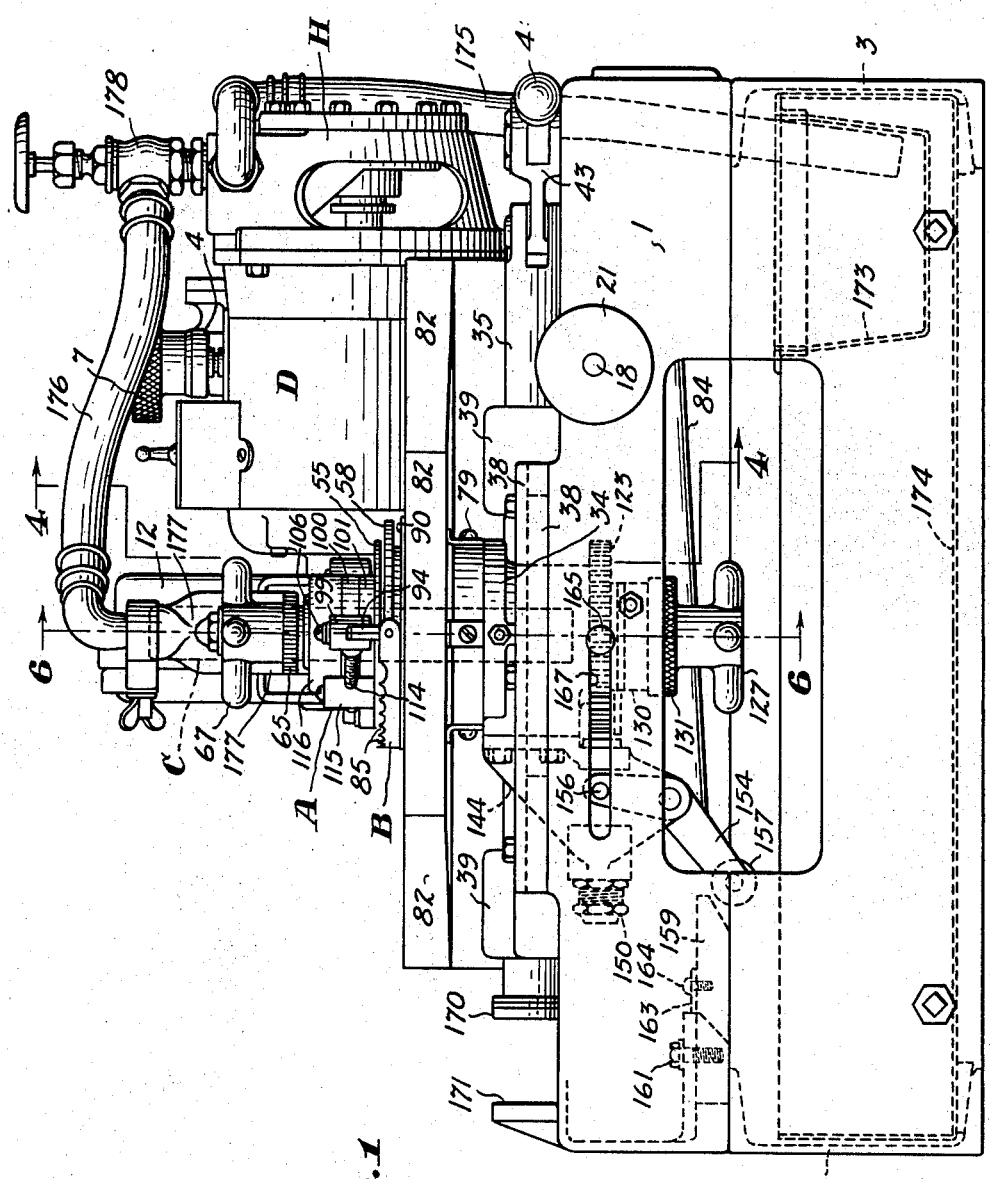
Figure 1 is a front elevational view of the grinder showing the blade holder at the grinding station with a curved blade mounted thereon.

Referring to the drawings by numerals of reference which indicate like parts throughout the several views, the grinding machine comprises a blade holder A which receives a blade B and holds the same in a curved position while reciprocating it across the peripheral abrading surface of a grinding wheel C actuated by an adjustably mounted motor D. The mechanism is mounted on a base E so as to be movable from place to place as a unit.

Figure 3:
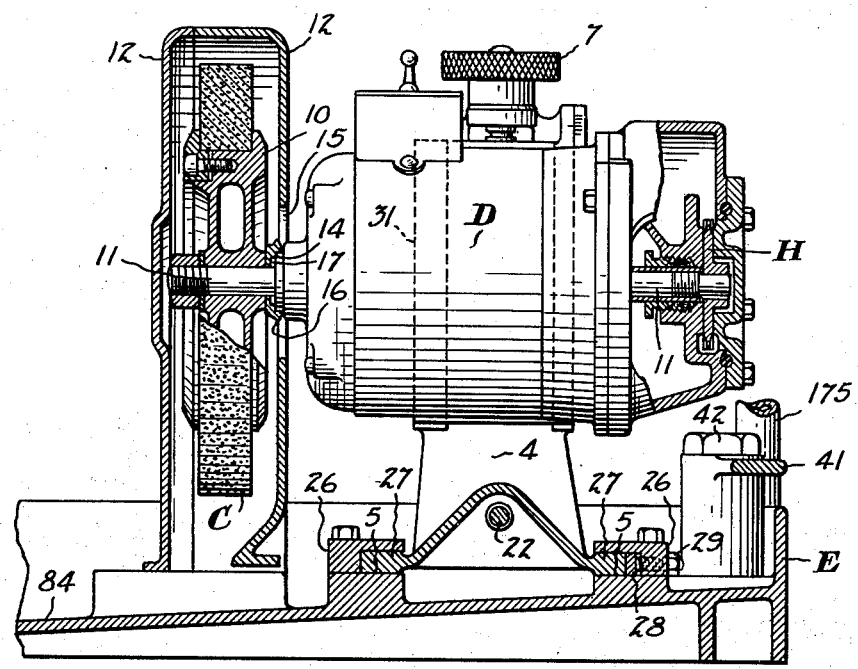
Fig. 3 is a detail view, partly in section and with parts removed, taken substantially on the line 3—3 of Fig. 2 showing the drive for the grinding wheel and the cooling liquid pump.

The base E comprises an integral main casting or body member 1, preferably of iron or steel, which is supported at its ends on channel members 2 and 3 which in turn may be mounted on any suitable stand or pedestal (not shown) so as to elevate the grinder to a convenient height for operation. A bracket 4 is mounted for horizontal movement toward and away from the position of the operator on spaced parallel slides 5 (Fig. 3) formed on the body 1. The motor D is secured to a slide 6 which is vertically adjustable on an upstanding portion of the bracket 4 by means of a hand wheel 7 which seats against the top of the bracket 4 and turns a screw 8 threadedly engaging the slide 6. The grinding wheel C is mounted on a flanged hub 10 secured on one end of shaft 11 of the motor D and is disposed within a suitable protective hood 12 which confines the grinding fluid and abrasive particles and has an aperture 15 in one side which receives the shaft 11. The hood 12 is attached to the cast member 1 of the base and does not move with the wheel C when the latter is adjusted. Accordingly, the opening 15 is considerably larger than required for passage of the shaft 11. A ring 14 is mounted just inside the hood aperture 15 on the motor shaft 11 and rotates therewith. The ring has a relatively sharp peripheral edge 16 which lies wholly within the chamber of the hood so that grinding liquid which finds its way to the central part of the hub 10 adjacent the ring 14 is cast away from the latter within the hood 12. In this manner the leakage of grinding liquid out of the hood chamber through the aperture 15 is minimized. Furthermore, the ring 14 intercepts grinding fluid before the same flows along the motor shaft 11 into the motor journal. Preferably, the ring 14 is recessed in one face so as to partly overlie the end of the motor journal, as indicated at 17.

Figures 4, 5:
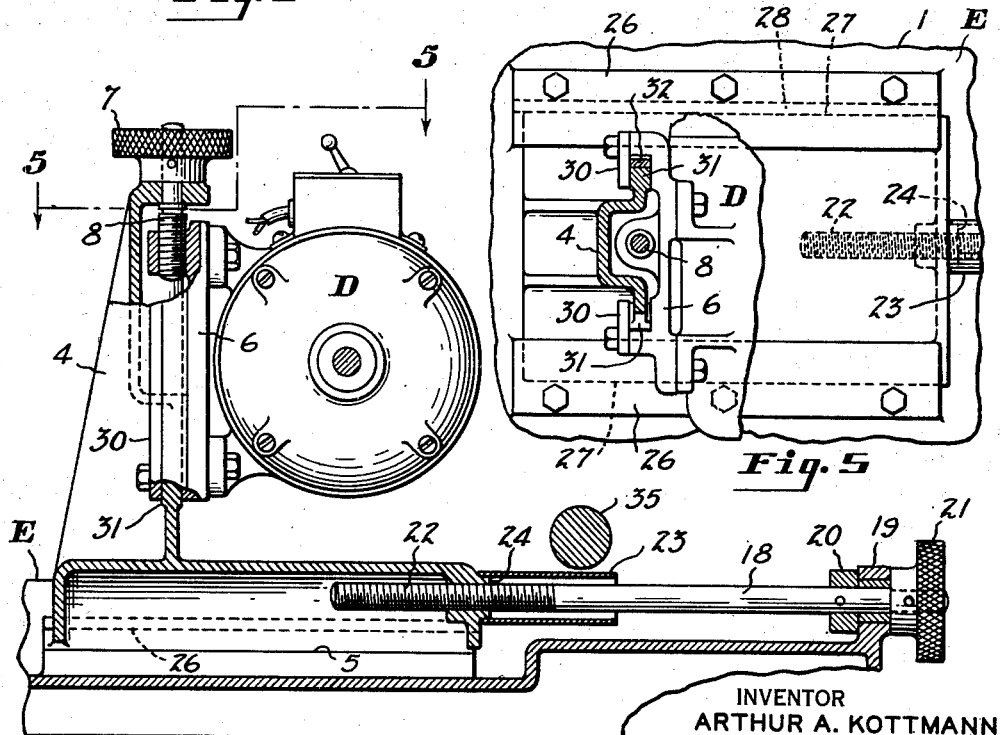
Fig. 4 is a detail view, partly in section and with parts removed, taken substantially on the line 4—4 of Fig. 1.
Fig. 5 is a fragmentary detail, partly in section and with parts removed, taken substantially on the line 5—5 of Fig. 4.

Horizontal adjustment of the grinding wheel C is effected by movement of the bracket 4 on the slides 5. An adjusting shaft 18 (Fig. 4) extends through front panel 19 of the body member 1 and is rotatably mounted therein, being held against endwise movement by a collar 20 and a hand wheel 21, the latter being disposed on the outside of the base. Threaded end 22 of the rod 18 is threadedly received in the base portion of the supporting bracket 4 so that rotation of the shaft by means of the hand wheel 21 moves the bracket and motor D toward or away from the operator's side of the grinder. A tubular member 23 is disposed about the shaft 18 to protect the threads of the shaft from the grinding liquid. This sleeve is received on a circular boss 24 formed on the bracket 4 around the threaded opening which receives the shaft 18. Gibs 26 hold runners 27 against the slides 5 and a shim 28 is disposed between one of the gibs and against the runner confined thereby to prevent lateral movement of the bracket 4. An adjusting stud and lock nut, indicated at 29, is provided to hold the shim 28 against the runner and to compensate for wear. Similarly, gibs 30 (Fig. 5) secure the motor slides 6 on vertical runner guides 31 of the bracket 4 and lateral play is prevented by means of an adjustable shim 32.

Figure 12:
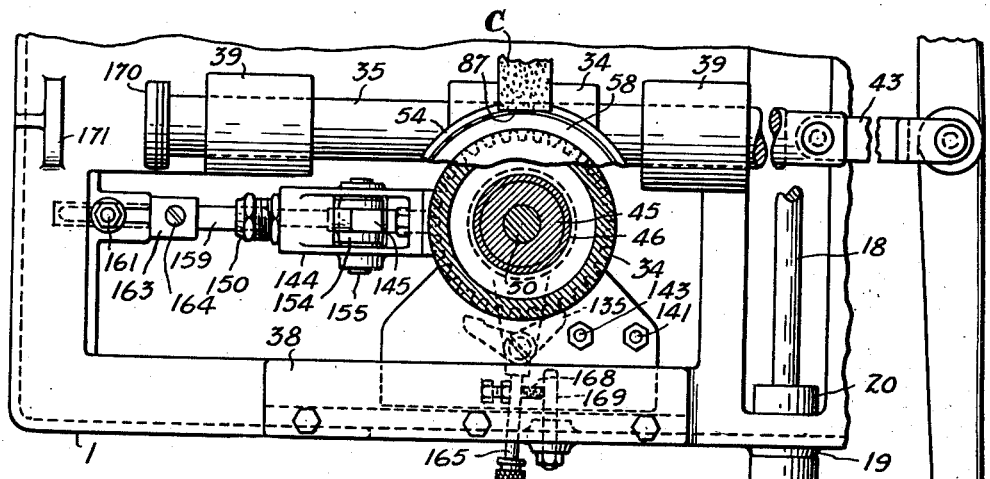
Fig. 12 is a fragmentary plan view of the blade holder and carriage, partly in section and with parts removed, showing the blade holder at the grinding station and taken substantially on the line 12—12 of Fig. 6.
Figure 13:
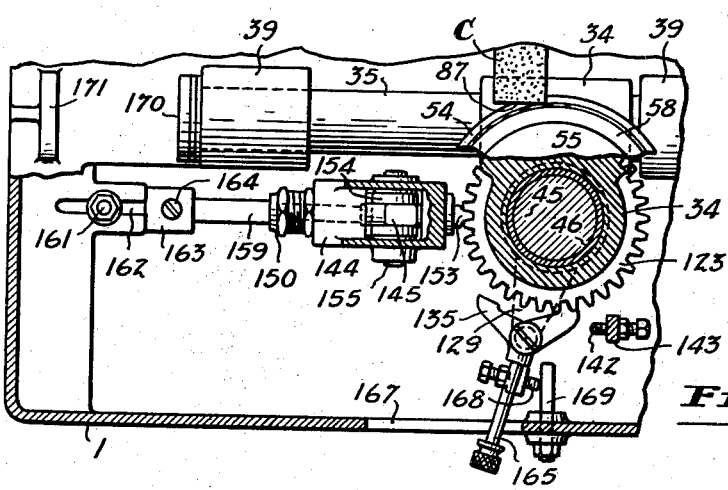
Fig. 13 is a view similar to Fig. 12 showing the blade holder at the end of a grinding stroke.

The blade holder A is mounted on a reciprocal carriage 34 (Fig. 6) secured on a bar 32 and having a laterally extending horizontal runner 36 which has sliding engagement with a slide 37 formed on the body member or casting 1. A gib 38 secures the runner 36 against the slide 37 to prevent pivotal movement of the carriage on the bar 35. This bar is disposed in substantially parallel relation with respect to the axis of rotation of the grinding wheel C and is mounted in slide bearings 39 (Fig. 12) formed on the body 1 of the base.

Figure 2:
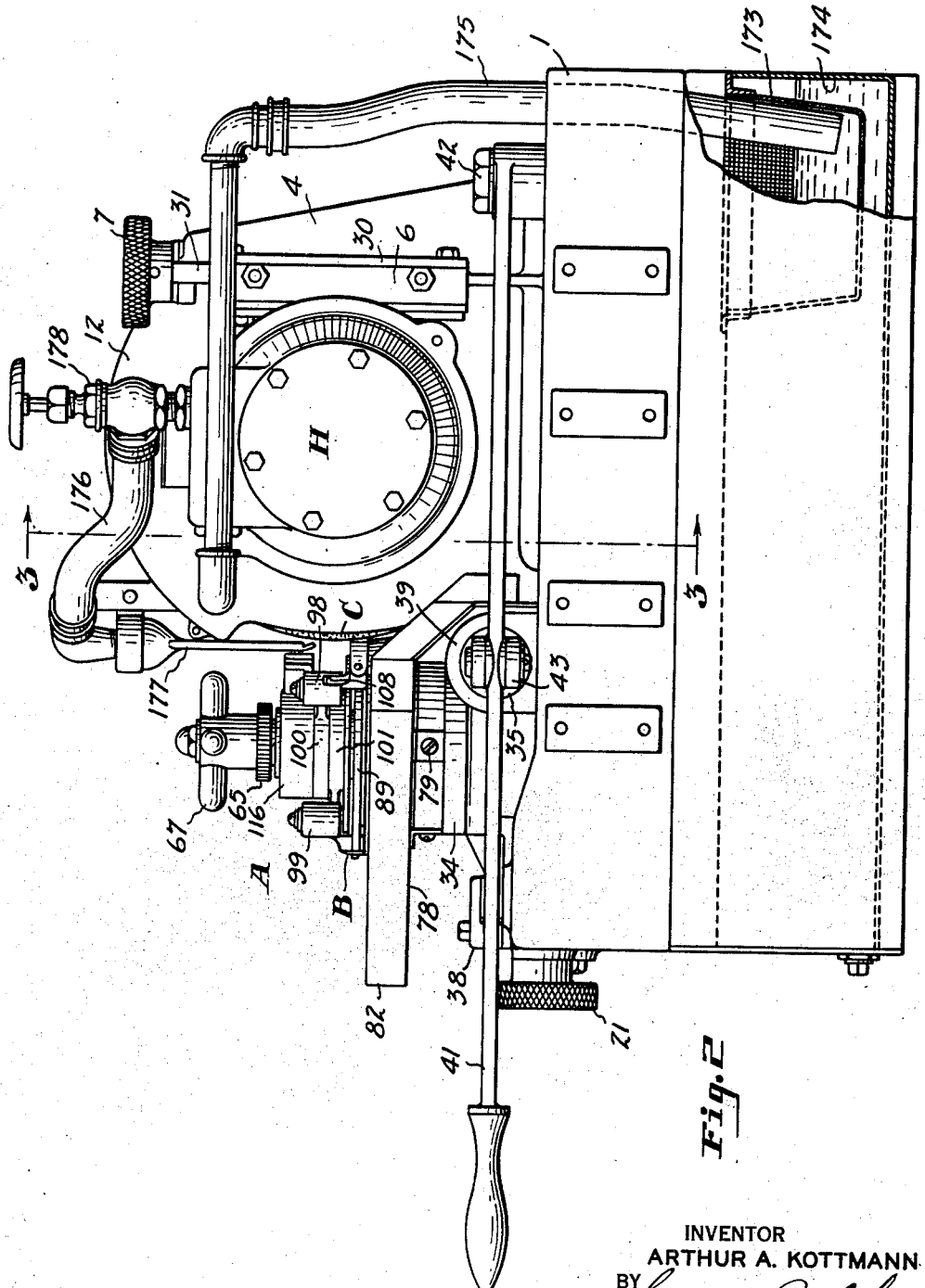
Fig. 2 is an end elevational view of the grinder, with parts removed.

The carriage 34 is secured on the bar 35 by set screw 40 and a lever 41 pivoted at 42 (Fig. 2) to the body casting 1 is connected to one end of the bar 35 by means of a clevis link 43. Thus by actuation of the lever 41 the operator can slide the bar 35 in the slide bearings 39 to move the carriage 34 and blade holder A back and forth across the grinding periphery of the wheel C over a path substantially parallel to the axis of rotation of the wheel.

A vertical bore 44 (Fig. 6) in the carriage 34 receives a vertically disposed rotatable spindle 45 embraced by a bushing sleeve 46. The spindle 45 is formed at its upper end with a circular flange 47 which rides on upper surface 48 of the carriage 34. An extension spindle 50 extending upwardly from the flange 47 in axial alignment with the spindle 45 is received in a socket 51 formed in the upper end of the spindle 45 and is secured in place by a pin 52. A circular head 54 is received on the extension spindle 50 and rests on the upper surface of the spindle flange 47.

Supported in spaced relation above the head 54 is a support member 55 which rests on pillars 56 secured in the head 54. Screws 57 fasten the support member to the pillars so that the head and support member rotate as a unit. Between the head and support member is adjustably mounted a substantially circular blade backing member or drum 58. An upwardly extending central cylindrical portion 59 of the blade drum 58 is received on and guided by a central circular upstanding sleeve 60 which is formed on the head 54 about the extension spindle 50. The cylindrical portion 59 of the blade backing member or drum is thus disposed within a bore 61 in an upright portion 62 of the support member 55. The cylindrical portion 59 of the blade drum has sliding engagement with the sleeve 60 so as to be guided thereby upon vertical adjustment of the blade drum with respect to the head 54. The head 54 and support member 55 are separated from one another a distance sufficient to provide a clearance 63 above and below the drum 58 between the upper surface of the head and the bottom surface of the support member, thus permitting sufficient movement of the drum 58 to accommodate all widths of blades to be ground, as will later appear. Also, clearance is provided in the bore 51 for the cylindrical portion 59 of the blade drum so as to avoid binding between the parts.

A rotatable adjusting sleeve 65 is received on the extension spindle 50 and rides on the upper end of the sleeve 60 of the head. This sleeve is provided with a knurled periphery and has threaded engagement 66 with the upper end of cylindrical portion 59 of the blade drum so that by rotation of the adjusting wheel the blade drum may be raised or lowered with respect to the head 54. The drum 58 is apertured to receive the pillars 56 and has sliding engagement therewith when moved up or down on the sleeve 60. The pillars prevent rotation of the drum with respect to the head 54 and support member 55.

A star wheel 67, received on the upper end of the spindle 50, has a hub 68 which bears against the upper end of the adjustable wheel 65. The spindle is surmounted by a cap nut 69 received on a reduced diameter threaded portion 70 of the spindle, so that by tightening of the cap nut the hub 68 may be forced against the adjusting wheel 65 to prevent rotation of the latter and lock the blade drum 58 in adjusted position.

The blade holder which comprises the head 54, support member 55, drum 58, and the related parts to be later described, is removable as a unit from the spindle 50 of the carriage by sliding the same off the top of the spindle, thereby permitting replacement of the blade holder by another of different size for accommodating blades of a different type. In order to lock the blade holder in position on the spindle 45, a dowel pin 71 extends upwardly from the flange 47 of the latter and is received within a bushing 72 set in an aperture in the head 54.

It is of considerable importance in grinding relatively thin slicing blades that the holder or fixture upon which they are mounted during the grinding operation be very rigid and subject to no more than a minimum lateral play or looseness. However, because of the use of liquid coolant required to prevent overheating of the thin blades during grinding and to insure an improved grinding operation, the bearing or bearings which carry the rotatable parts of the blade holder may be subjected to considerable wear unless provision is made to protect them from the abrasive cooling liquid. In the present invention this result has been achieved by a unique construction of the blade holder which materially reduces the likelihood of the liquid reaching the journals or the bearing surfaces of the blade holder. As shown in Fig. 6, upper surface 74 of the head 54 slopes downwardly and away from the central sleeve 60 so that liquid which enters the clearance 63 between the blade drum 58 and the top of the head 54 flows radially over the surface 74 toward the periphery of the head. An upstanding abutment or circular rim 75 is formed at the periphery or margin of the head 54 and extends above the level of the sloping surface 74. Downwardly directed apertures 76 are formed through the rim 75 for the release of liquid from the surface 74.

A circular flange 77 of less diameter than the rim 75 is formed on the underside of the blade drum 58 inwardly from the peripheral surface thereof and is disposed inside the rim 75 of the head 54 so as to have telescopic movement with respect thereto. Cooling liquid which may enter the clearance 63 between the head 54 and drum 58 strikes the flange 77 and drops into the troughlike formation around the periphery of the head inside the rim 75 and flows thence through the aperture 76. A trough 78, which may be constructed of any suitable material such as sheet metal, is secured to the top of the carriage 34 by screws 79. The trough 78 is formed at its center with circular flange 80 which is of less diameter than the head 54 and extends upwardly into a circular channel or recess 81 formed in the underside of the head. All sides of the trough 78, except that disposed toward the grinding wheel C, are formed with upwardly extending wall portions 82 which confine the grinding liquid so that the latter flows over a depending apron 83 formed on the grinding wheel side of the trough. The apron 83 directs the grinding liquid into a settling basin 84 formed in the body portion 1 of the base.

The blades B are usually formed of relatively hard spring steel and when deformed or bent they normally tend to return to their flat straight line shape. However, in order to grind curved scallops or serrations 85 in the blades, the latter are deformed into a circular shape and, while held in a horizontal plane against the drum 58, succeeding portions of their cutting edges are successively presented to peripheral abrading surface 87 of the grinding wheel C below the horizontal center line 88 of the latter. In accordance with the present invention a blade to be ground is wrapped about peripheral or cylindrical surface 89 of the drum 58 so that the rear or non-cutting edge of the blade abuts against shoulder or top surface 90 of the rim 75 on the head 54. As shown in Fig. 6, the diameter of the drum 58 is slightly less than the diameter of the head 54. This difference in diameter is slightly more than twice the thickness of the blades to be ground, so that a firm abutment for the rear edge of the blade is afforded substantially throughout its entire length by the shoulder 90.

The blade to be ground is retained in its curved shape and against the surface 89 of the drum by means of pins 91 and 92 (Fig. 7), which are received in suitable holes adjacent the ends of the blades. The pins are carried by depending portions 95 of adjustable fittings 93 and 94, respectively. These fittings are received in transverse slots 102 (Fig. 11) formed in the lower ends of friction pistons 96 slidably received in elongated cylindrical bores 97 formed in the ends of locating arms 98 and 99 extending radially from ring elements 100 and 101 which embrace the upright portion 62 of the support member 55. The axis of each of the pistons 96 is substantially vertical and parallel to the axis of the spindle shaft 50 so that the movement of the pistons and fittings 93 is parallel to the movement of the drum 58. A longitudinal groove 103 is formed in each of the pistons 96 to receive a bowed spring 104 which engages the surface of the bore 97 to retain the piston in adjusted position. The upper end of the spring 104 extends laterally under a washer 105 on the top of the piston 96 which is held in place by a screw 106 extending longitudinally through the piston and having threaded engagement with the fittings 93 and 94 to secure the latter in the slots 102 of the respective pistons. The elements 93 and 94 extend through vertical slots 108 (Fig. 2) in the cylindrical portions of the locating arms 98 and 99 and engagement of the elements with the sides of the slots 108 prevents twisting movement of the pistons 96 in the bores 97 to retain the blade holding elements in radial positions with respect to the spindle 50.

Depending portion 95 of the fitting 94 extends into a cutaway portion 109 (Fig. 7) in the periphery of the drum 58. In this manner slight circumferential adjustment of the position of the pin 92 may be effected by rotation of the ring 101 about the upright portion 62 of the support member 55. A laterally extending ear 110 formed on the ring 101 is provided with a circumferentially disposed elongated slot 111 which receives a tightening bolt 112 threaded into the support member 55. When adjusting the position of the pin 92, as will be later described, the bolt 112 is loosened and when the adjustment is completed the bolt is tightened to lock the ring 101 in the position desired. In order to provide for vernier or micromatic adjustment of the pin 92, an adjusting screw 114, threaded through a post 115 secured to the support member 55, bears against one side of the rigid locating arm 99 to move the latter circumferentially about the spindle 50.

A collar 116 is received on a reduced diameter end portion at the top of the upright portion 62 of the support member and is held in adjusted position by a set screw 117. A radial extension 118 on the collar receives one end of a helical compression spring 119, the other end of the spring being seated in a socket formed in extension 120 of the adjustable or spring tension locating arm 99. The tension in the spring is adjustable by means of a set screw 121 threaded through the extension 118 and engageable with one end of the spring.

A reduced diameter shaft 122 (Fig. 6) extends from the spindle 45 below the carriage 34 and receives a rack member or ratchet wheel 123 which is secured to the spindle 45 by means of counter sunk screws 124. The rack or ratchet wheel seats against the underside of the carriage 34 and prevents vertical movement of the spindle 45 in the bore 44. Beneath the ratchet wheel 123 the shaft 122 receives an adjustable sleeve 125 which is secured in adjusted position by means of a star wheel 127 threaded on reduced diameter end portion 128 of the shaft 122. The hub of the star wheel engages the lower end of the sleeve 125 so as to force the latter against the underside of the ratchet wheel 123. A lever arm 129 has a ring-like end portion 130 which embraces and is rotatably carried by the sleeve 125, being retained thereon by a knurled adjusting collar 131 threadedly received on a reduced diameter bottom end portion of the sleeve 125 and locked in position by a set screw 132. A boss 133 formed on the arm 129 receives a vertically disposed pivot pin 134 (Figs. 8 and 9) on which is mounted a pawl 135. Circular spring 136 is disposed about the boss 133 and urges nose 137 of the pawl into engagement with teeth 138 of the ratchet wheel 123 to lock the blade holder against rotation.

A tension spring 140 is connected between the arm 129 and a post 141 depending from the carriage 34 to normally draw the arm to the right, as viewed in Figs. 8, 12, 13, and 14, so that the pawl 135 is held against an adjustable stop screw 142 threaded through a member 143 depending from the carriage 34.

On the left hand end of the carriage 34 is secured a bracket 144 (Fig. 9) which carries a reciprocal rod or indexing pawl 145 in spaced bearing portions 146 and 147. The indexing rod 145 has a reduced diameter portion 148 which is slidable in an adjusting bushing 150 threadedly carried by the portion 146. A helical compression spring 151 is disposed about the portion 148 of the indexing member and within a counter-bore in the bushing 150. This spring seats against a collar 152 which abuts against a circumferential shoulder on the indexing member. In this manner the indexing pawl is normally urged to the right, as viewed in Figs. 9, 12, 13, and 14, so that nose 153 thereof is forced between adjacent teeth 138 of the ratchet wheel 123.

Figure 14:
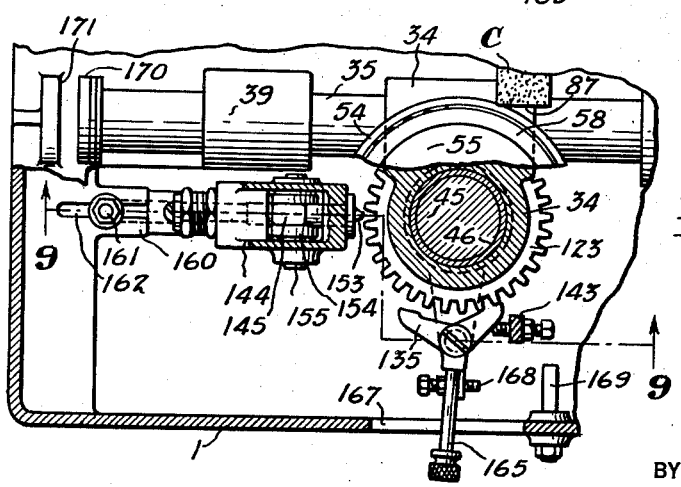
Fig. 14 is a view similar to Figs. 12 and 13 showing the blade holder at the beginning of a grinding stroke.

A release lever in the form of a bell crank 154 is journaled at 155 in a depending portion of the bracket 144 and has a clevis at its upper end which embraces the indexing pawl 145 and is pivoted thereto at 156. The lower end of the bell crank lever has a roller 157 which rides under a cam 159 when the carriage 34 is moved to the left as shown in Figs. 9 and 14. The cam member 159 is adjustably secured to an extension portion 160 (Fig. 14) of the body casting 1 by means of a bolt 161 which passes through an elongated slot 162 in the portion 160 is threaded into the cam 159. As a precaution against movement of the cam member from adjusted position, a stop 163 (Figs. 9 and 13) is secured to the top of the cam by a screw 164 and abuts against the end of the bracket portion 160. This stop also insures that the cam member 159 is replaced in correct position after having been removed for any reason, such as when dressing the wheel C.

Upon engagement of the cam 159 by the roller 157 the bell crank lever 154 is pivoted in a counterclockwise direction, as viewed in Fig. 9, so as to move the indexing pawl 145 to the left, against the spring 151, and to withdraw the nose 153 from the ratchet wheel 123, thus releasing the blade holder for rotation.

An arm 165 is secured in the pawl 135 and extends through a slot 167 in the body casting 1. By movement of the arm 165 to the left, the operator can manually release the pawl 135 from the ratchet wheel 123 so that when the indexing pawl 145 is also retracted the blade holder may be rotated by hand. Thus, the double pawl arrangement prevents the manual rotation of the blade holder except when the carriage 34 is at its limit of movement to the left. Accordingly, the blade holder cannot be rotated by the operator except when it is removed from the grinding wheel.

During each movement of the carriage and blade holder to the light, as viewed in Figs. 1, 8, 12, 13, and 14, the ratchet wheel is held against rotation by the indexing pawl 145, the nose of which is wedged between the teeth of the ratchet wheel. As the carriage completes its movement to the right a screw 168 adjustably secured in an extension portion of the arm 129 engages a stop 169 extending inwardly from the front wall of the body 1. Movement of the carriage while the screw 168 is against the stop 169 pivots the arm 129 in a clockwise direction, as viewed from above, about the shaft spindle 122, withdrawing the nose 137 of the pawl 135 from the teeth of the ratchet wheel 123 so that the pawl moves beyond the next tooth. As the carriage moves to the left, the spring 140 draws the arm 129 to the right so that the nose 137 of the pawl engages the succeeding tooth in the ratchet wheel. However, the indexing pawl 145 remains engaged with the teeth of the ratcheting wheel and prevents rotation of the spindle and blade holder so that the carriage moves to the left with the spring 140 under tension. Upon completion of the return movement of the carriage and blade holder, the cam 159 actuates the bell crank lever 154 to withdraw the indexing pawl 145, thus releasing the ratcheting wheel so that the tension in the spring 140 through the inter-engagement of the pawl 135 and the ratcheting wheel 123 rotates the spindle and blade holder in a counter-clockwise direction, as viewed from above. The limit of this rotating movement is determined by the screw 142 which engages the pawl 135 to limit the movement thereof. Upon movement of the carriage and blade holder to the right, the indexing pawl is released to re-engage the ratchet wheel and lock the blade holder against rotation for the next grinding operation. The rotative movement thus imparted to the blade holder upon each reciprocation of the carriage is equal to each previous like rotative movement and is predetermined so as to present the next succeeding portion of the blade being ground to the peripheral abrading surface of the wheel.

Desirably, the end of the bar 35 opposite the clevis link 43 is provided with a cushion bumper 170 which is engageable with an upwardly extending bracket 171 on the casting body 1, thus limiting the movement of the carriage and blade holder to the left.

A finger 172 (Figs. 6 and 8) is formed on the adjustable sleeve 125 and extends laterally, underneath the ratchet wheel 123 beyond the periphery of the teeth 138. This finger rotates with the ratcheting wheel and blade holder and may be adjusted with respect to the ratcheting wheel by means of the knurled collar 131 after the star wheel 127 is loosened to release the sleeve. The finger is set so that it rides under a depending portion of the nose 137 of the pawl 135 to prevent engagement of the pawl with a succeeding tooth of the ratcheting wheel after the grinding of the last scallop or serration of the blade B. For different length blades, the position of the finger must be altered.

On the end of the motor D opposite the grinding wheel C is mounted a pump H which draws grinding liquid from the inside of a wire basket 173 immersed in the liquid contained in a clarification tank 174 carried between the channel members 2 and 3. The liquid is drawn through an intake conduit 175 and forced through an outlet conduit 176 which is connected to a nozzle 177 attached to the hood 12 and arranged to direct the grinding liquid onto the portion of the blade being ground and the abrading periphery of the grinding wheel C. Preferably, a shut-off valve 178 is provided for the conduit 176 so that the operator can regulate the flow of cooling liquid as desired. Some of the grinding liquid flows over the blade carrier and is directed into the settling basin 84 by the apron of the trough 78, while the remainder flows or is projected into the basin in other fashion. All of the liquid, or substantially so, finally reaches the settling basin, from which it flows through a suitable trap (not shown) in the end of the clarification tank 174 opposite the strainer or basket 173.

In operating the device to resharpen slicing machine blades, the carriage 34 carrying the blade holder A is moved to its extreme left position, as viewed in Figs. 1, 12, 13, and 14, by means of the lever 41 to substantially the position illustrated in Fig. 14. In this position the nose 153 of the indexing pawl is withdrawn from the ratcheting gear 123. The ratchet control knob on the arm 165 is shifted to the left to release the pawl 135 from the ratchet wheel 123. The spindle 45 and the blade holder carried thereby are thus released and the operator rotates the holder A in clockwise direction, as viewed from above, to starting position by means of the star wheel 67. When the holder has been rotated to starting position, it is arrested by a pin 180 (Fig. 6) set in the surface 48 of the carriage 34 and which pin engages a shoulder (not shown) at one end of a circular channel 181 formed in the underside of the spindle flange 47 to receive the pin.

The blade to be sharpened is grasped at each end with its points or cutting edge uppermost and the hole in the left hand end is hooked over the pin 92 of the rigid locating arm 99. While maintaining a slight tension in the blade it is bent around the periphery 89 of the drum 58 and the hole in the right hand end hooked over the pin 91 of the spring pressed locating arm 98.

The locating arms 98 and 99 which hold the fittings 93 and 94 carrying the pins 91 and 92 are adjusted so that the circumferential distance around the drum 58 between the pins is substantially equal to the distance between the locating holes in the ends of the blade. In adjusting the arms, they are released by loosening the collar 116 and the bolt 112 which hold the arms 98 and 99, respectively. The rigid arm 99 is first adjusted by means of the screw 114 so that point 182 (Fig. 7) between the first and second scallop or serration of the blade B is in direct radial alignment with a gauge or index mark 183 on the support member 55. The position of the gauge mark 183 is such that a blade mounted on the holder A in the manner described, has the first scallop thereof drawn across the peripheral abrading surface of the wheel C upon the subsequent movement of the carriage to the right, provided, of course, that the blade holder has first been rotated to starting position. During such movement, the indexing pawl 145 is automatically released to lock the blade holder against rotation.

The spring tension arm 98 is then adjusted so as to accommodate the particular length of blade being reground or sharpened by rotating the collar 116 in unison with the ring 100. In adjusted position the collar 116 is secured by set screw 117 on the upright portion 62 of the support member so that the spring 119 is compressed when the locating pin 91 is engaged in the hole of the blade. Thus the blade B is tensioned around the cylindrical surface of the drum 58 with its rear or non-cutting edge abutting against the shoulder or surface 90 of the head 54 which parallels the surface 89 of the drum 58. In grinding thin flexible blades of the character contemplated by this invention it is essential that they be firmly supported during the grinding operation in order that the scallops ground thereon may be uniform and accurately formed. As previously mentioned, the width of different blades will vary depending upon such factors as the number of times they have been resharpened. The upper edge of the surface 89 of the backing member or drum must be disposed between the edges of the blade and should not extend above or beyond the bottoms of the scallops to be ground or sharpened. Accordingly, the distance from the top surface or shoulder 90 of the head 54 to the upper edge of the cylindrical surface 89 of the drum 58 must be varied to compensate for the different blade widths. Therefore, the unique arrangement of the present invention, by means of which the drum 58 may be raised or lowered after the blade is in place, affords a simple and effective adjustment whereby the operator can quickly and accurately adjust the holder for blades of different widths. Accordingly, the cap nut 69 is loosened to release the knurled adjusting wheel 65 so that the latter may be rotated to raise or lower the drum 58 as desired. This adjustment of the effective drum width, made with respect to the supporting shoulder 90, can be performed after the blade is in place on the holder, or before the blade is attached. It is apparent that the "floating" drum disclosed herein permits minute alterations in the distance from the shoulder 90 to the upper edge of the blade supporting surface 89 of the drum. Hence, the portion of the blade presented to the grinding wheel is reinforced against deflection by the drum which may be moved very close to the bottoms of the scallops.

In fitting a blade to the holder A, the friction pistons 96 are raised or lowered as required in the arms 98 and 99 so that the back edge of the blade seats squarely on the shoulder 90 when the retaining holes of the blades receive the pins 91 and 92.

When the blade is mounted on the holder the sleeve 125 is adjusted to position the finger 172 so that upon completion of the grinding of the last scallop of the blade the finger engages the pawl 135 to withdraw the latter from the ratcheting wheel 123 and prevent further rotation of the holder even though the reciprocation of the carriage may be continued.

The operator then backs the wheel C away from the path of the blade holder by means of the hand wheel 21. The carriage and holder are then advanced to the grinding position in front of the wheel, as shown in Fig. 1, and the grinding wheel is carefully adjusted, horizontally by means of the hand wheel 21 and vertically by means of the hand wheel 7, so that the scallop or serration ground in the blade is of the proper dimensions as to height and depth of cut.

With these adjustments completed, the operator opens the valve 178 to permit grinding liquid to flow onto the grinding wheel and the blade through the nozzle 177. The motor D is set in operation and the holder A is reciprocated back and forth across the rotating wheel C by actuation of the lever 41. During each movement of the carriage and holder to the right over a grinding or work stroke or path from substantially the starting position shown in Fig. 14 to the finishing position shown in Fig. 13, the blade being ground is carried across the peripheral grinding surface 87 of the wheel C and the spindle 45 and holder A are locked against rotation by the pawl 145. The screw 168 and the arm 129 engage the stop 169 (Fig. 12) before the completion of the grinding stroke and the cocking or resetting of the pawl occurs during the final movement of the carriage and holder from substantially the position shown in Fig. 12 to that shown in Fig. 13. As soon as the carriage and holder reach the limit of their movement to the left on the return path or stroke, the indexing pawl 145 releases the ratcheting wheel 123 so that the latter is shifted or rotated by the pawl under the influence of the spring 140 to rotate or shift the carrier or blade holder A a sufficient amount to bring the next succeeding scallop into position to be ground by the wheel C on the next grinding or work stroke. This procedure continues until all the scallops on one side of the blade have been resharpened, after which the blade is removed by the operator, reversed, and re-attached to the holder for grinding the opposite side in the same manner. Similarly, successive blades are ground or resharpened, one after another. In the event that a succession of blades of identical character are to be reground, then only one "set up" of the holder and carriage need be made, since the adjustments for the first blade of the series satisfies the dimensional requirements of the following blades. However, in the case of blades having different dimensions, the carriage and holder must be adjusted to suit the particular needs of each. But such adjustments may be made quickly and accurately with the device of the present invention.

Figure 15:
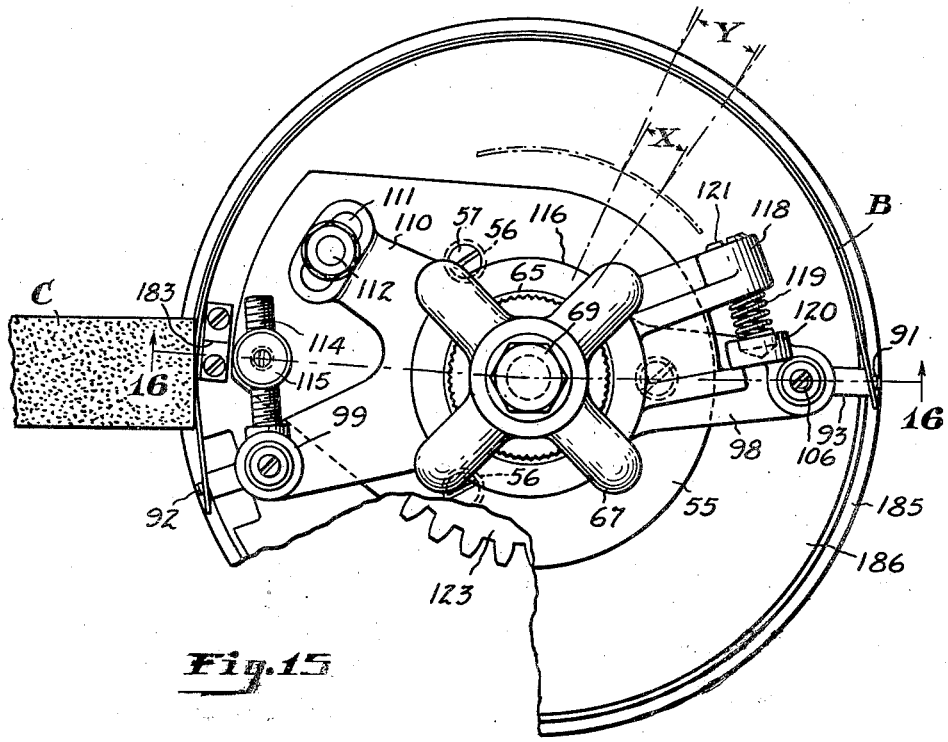
Fig. 15 is a plan view, with parts removed, of a modified blade holder mounted on the carriage.
Figure 16:
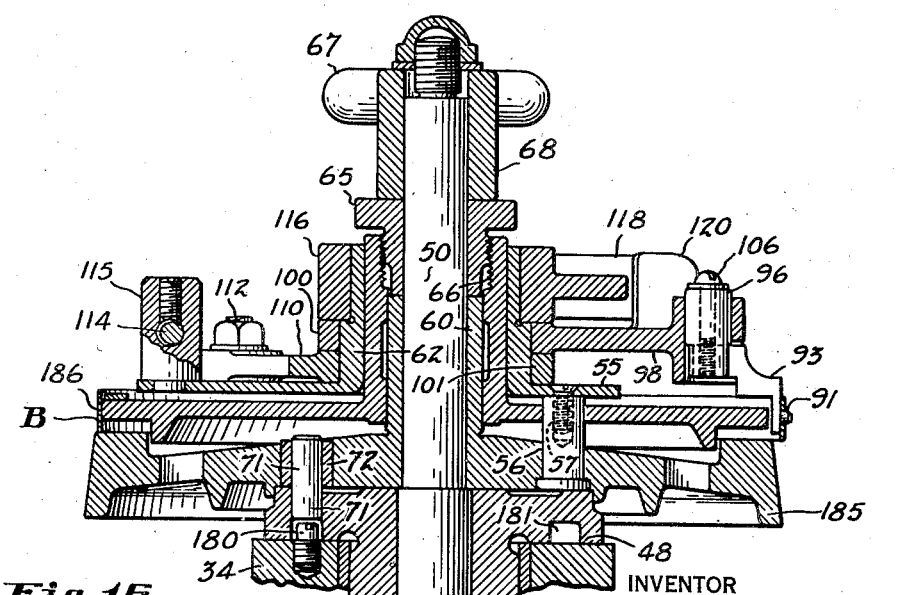
Fig. 16 is a sectional detail, with parts removed, taken substantially on the line 16—16 of Fig. 15.

When blades having longer scallops are being resharpened, a larger diameter holder may be employed, such, for example, as that illustrated in Figs. 15 and 16. In this modification head 185 and drum 186 are of materially greater diameter than the ratcheting wheel 123. The difference in length of scallop or serration ground on a blade carried by the holder shown in Figs. 15 and 16 as compared with that previously described, is diagrammatically shown in Fig. 15. The distance X represents the length of scallop or distance between successive points of the cutting edge on a blade ground on the holder shown in the preceding figures and the distance Y represents the corresponding distance between successive points on a blade ground on the holder shown in Figs. 15 and 16.

The present invention contemplates the use of a multiplicity of interchangeable blade holders which are adapted to be used on a single carriage. The interchangeability of the holders is facilitated by the unique construction previously mentioned wherein the holder has a sliding fit over the extension spindle 50 and is locked for rotation with the spindle 45 by means of the dowel pin 71 received in the bushing 72 of the holder head. Accordingly, blades having different scallop length or other dimensional characteristics can be reground or sharpened on the machine of the present invention and the changeover from one to another may be easily accomplished in a short period of time.

Figure 17:
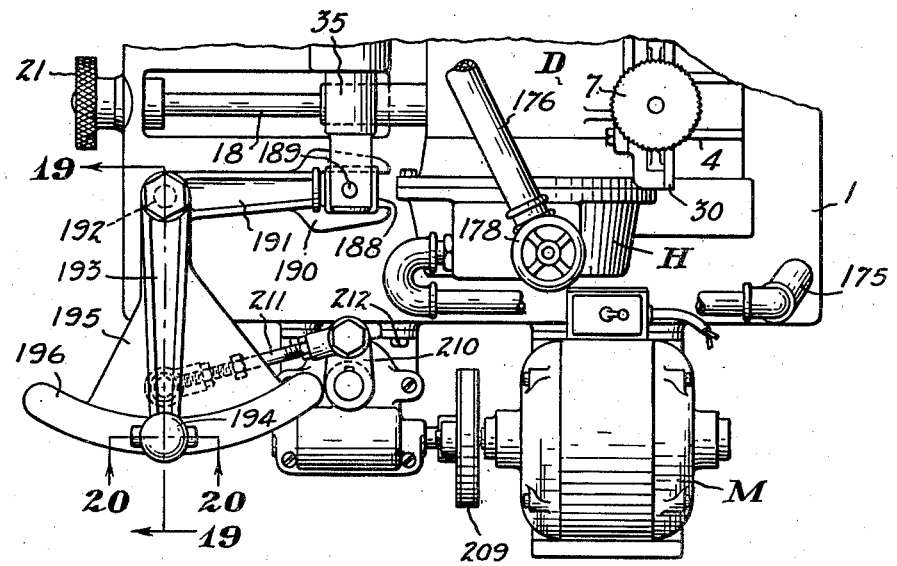
Fig. 17 is a plan view, with parts removed, showing a mechanical mechanism for reciprocating the blade holder and carriage.
Figure 18:
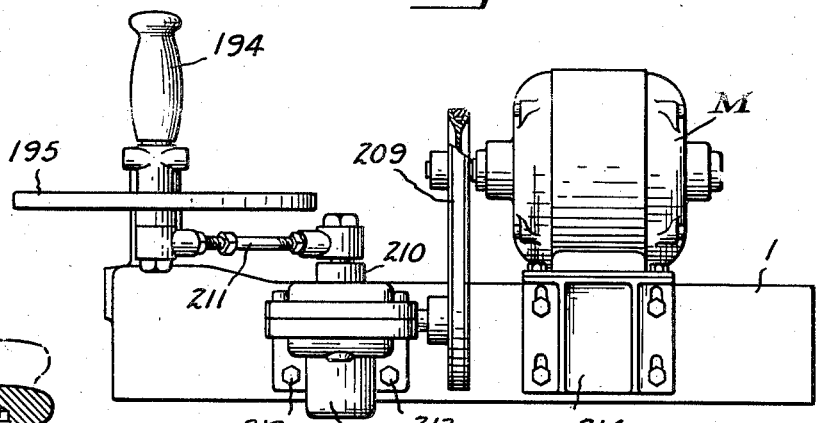
Fig. 18 is an elevational view, partly broken away, of the reciprocating mechanism shown in Fig. 17.
Figures 19, 20:
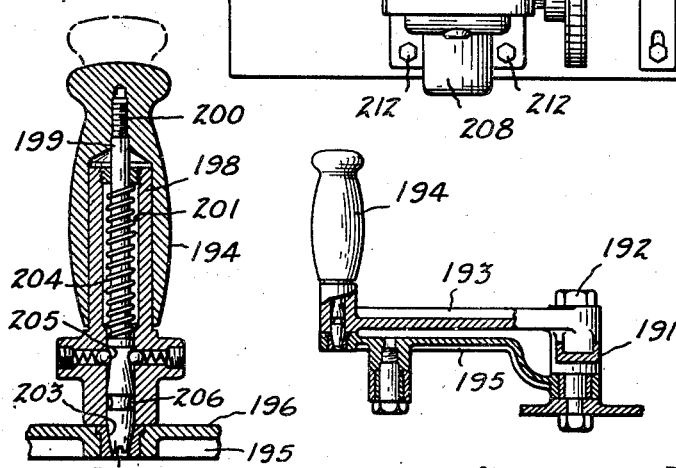
Fig. 19 is a sectional detail taken substantially on the line 19—19 of Fig. 17.
Fig. 20 is a sectional detail taken substantially on the line 20—20 of Fig. 17 and enlarged with respect thereto.

In Figs. 17 and 18 is illustrated a modification of the invention wherein the reciprocation of the blade holder may be effected by means of an electric motor M. The bifurcated end of the bar 35 carries a crosshead block 188 pivoted at 189. This block is slidingly engaged by bifurcated end 190 or arm 191 of a bell crank lever mounted on a vertical pivot 192 on the body member 1 of the grinder base E. The other arm 193 of the bell crank lever can be oscillated about the pivot 192 so as to reciprocate the bar 35 and blade holder in a manner similar to that previously described. A quadrant 195 is mounted on the pivot 192 beneath the bell crank lever and has a track 196 which underlies the path of the handle 194. The handle 194 is slidingly received on an upstanding cylindrical portion 198 formed on the end of the lever arm 193. A spindle 199 is threaded into the handle 194 at 200 and extends axially through a bore 201 in the cylindrical portion 198 of the lever. Lower end 202 of the spindle 199 normally projects from the bottom of the lever and engages in an aperture 203 formed in a bushing set into the track 196 of the quadrant 195. When the spindle 199 is thus engaged in the recess or hole 203, the bell crank lever and quadrant are latched together for synchronous oscillation. Raising the handle 194 to the broken line position indicated in Fig. 20 withdraws the tapered end 202 of the spindle from engagement in the track of the quadrant, permitting the parts to oscillate independently. A spring 204 normally urges the spindle 199 downwardly so as to retain the end 202 thereof in the aperture 203. Spring pressed detents 205 are carried by the arm 193 of the bell crank lever and engage a circumferential groove 206 in the spindle 199 to retain the latter in its raised position out of engagement with the track aperture 203. The end 202 of the spindle has a taper fit in the aperture of the bushing to compensate for wear and the detents 205 are arranged so as to be readily overcome by manual pressure in the handle 194.

The motor M drives a speed reducing mechanism 208 through a belt 209, and a crank 210 rotatably mounted on the power outlet shaft of the speed reducer actuates the quadrant 195 by means of an adjustable length link 211. Thus the oscillation or movement of the blade holder A may be effected by manually grasping the handle 194 and actuating the bell crank lever, or, if desired, the movement of the blade holder may be effected by means of the motor M. If during mechanical or motor actuated movement of the blade holder it is desired to disconnect the drive, this may be done by grasping the handle 194 and raising the latter so as to withdraw the end 202 of the spindle from the recess 203 in the track of the quadrant. Thus the reciprocation of the blade holder and carriage may be arrested substantially instantaneously without stopping the drive motor M.

As shown in Figs. 17 and 18, the speed reducing mechanism 208 is attached directly to the right hand end of the casting or body member 1 by means of bolts 212 while the motor M is mounted on a bracket 214 attached to the same end of the body 1. Accordingly, the grinder of the present invention can be produced either for manual or mechanical actuation of the carriage, using substantially the same parts except for the elements required to connect the reciprocable bar 35 with the drive motor M.

Although the description of the invention has been directed primarily to the application of the invention to a grinding machine for resharpening or regrinding thin flexible cutter blades, it is to be understood that it is equally applicable to the manufacture of such cutting blades from blade blanks not having any scallops or serrations formed therein, or to blade blanks having unsharpened serrations formed along one edge.

Other modes of utilizing the principles of the present invention may be resorted to, change being made with regard to the particular details of construction and procedure set forth as desired, numerous modifications and substitutions of parts being contemplated, it being understood that the particular embodiments shown in the drawings and described above are given for purposes of explanation and illustration.

What I claim is:

1. A holder for mounting a thin flexible blade comprising a head, a support member secured to the head in spaced relation with respect thereto, a drum disposed between the head and support member and movable toward and away from the head, and means carried by the support member for securing the ends of a blade curved about the periphery of the drum.

2. A holder for mounting a thin flexible blade comprising a head, a support member secured to the head in spaced relation with respect thereto, a drum disposed between the head and support member and movable toward and away from the head, and means carried by the support member for securing the ends of a blade curved about the periphery of the drum, said blade securing means being movable toward and away from the head.

3. A holder for mounting a thin flexible blade comprising a head having a blade supporting periphery, a support member secured to the head in spaced relation with respect thereto, a drum disposed between the head and support member and movable toward and away from the head, and means carried by the support member for securing the ends of a blade curved about the periphery of the drum and supported by the head, said blade securing means being adjustable to different positions about the drum periphery for accommodating blades of different lengths.

4. A holder for mounting a thin flexible blade comprising a head, a support member secured to the head in spaced relation with respect thereto, a drum disposed between the head and support member and movable toward and away from the head, and means carried by the support member for securing the ends of a blade curved about the periphery of the drum, said blade securing means being adjustable to different positions about the drum periphery for accommodating blades of different lengths and movable toward and away from the head independently of the drum for accommodating blades of different widths.

5. A holder for a thin flexible blade comprising a rotatable head having a substantially circular periphery, a support member secured to the head in spaced relation thereto, a backing member disposed between the head and support having a substantially circular periphery of less radius than the head periphery, means carried by the support member for securing the ends of a curved blade to hold the blade against the periphery of the backing member, said means including a movable arm having an element arranged to be adjusted to overlie different portions of the backing member, and means for varying the distance from the backing member to the head.

6. A holder for a thin flexible blade comprising a head having a shoulder for engagement with an edge of a blade mounted thereon, a support member attached to the head, an arm carried by the support member, a blade holding element adjustably secured to the arm at one end thereof, and means on said element for engaging one end of a blade disposed against the shoulder of the head, said adjustment of the element being arranged to vary the distance from the blade engaging means to the shoulder to accommodate blades of different widths.

7. A holder for a thin flexible blade comprising a head having a shoulder for engagement with an edge of a blade mounted thereon, a support member attached to the head, an arm carried by the support member, an adjustable blade holding element slidably mounted in one end of the arm, resilient means for retaining the element in adjusted position with respect to the arm, and means on said element for engaging one end of a blade disposed against the shoulder of the head, said adjustment of the element being arranged to vary the distance between the blade engaging means and the shoulder.

8. A holder for a thin flexible blade comprising a substantially circular head, a peripheral shoulder on the head, a support member carried by the head in spaced relation with respect thereto, a drum disposed between the head and the support member, means guiding the drum for movement toward and away from the head, said drum having a peripheral blade backing surface adjacent the peripheral shoulder on the head, a blade attaching arm mounted on the support member, and an element on said arm extending in overlying relation with respect to the peripheral surface of the drum for securing an end of a blade disposed against the drum, said element being shiftable toward and away from the head shoulder over said drum surface to accommodate blades of different widths.

9. A holder for a thin flexible blade comprising a substantially circular head, a peripheral shoulder on the head, a support member carried by the head in spaced relation with respect thereto, a drum disposed between the head and the support member, means guiding the drum for movement toward and away from the head, said drum having a peripheral blade backing surface adjacent the peripheral shoulder on the head, a pair of blade attaching arms mounted on the support member, both of said arms being adjustable with respect to the drum, one arm having limited movement over a relatively small portion of the drum periphery and the other arm having substantially free movement over substantially the entire drum periphery, means for rigidly securing one of the arms to the support member in adjusted position, means for resiliently securing the other arm to the support member in adjusted position, and an element carried by each arm having means for engaging an end of a blade mounted on the holder.

10. A holder for a thin flexible blade comprising a head having a marginal shoulder to support an edge of a blade, an adjustable backing member having a surface paralleling the shoulder and engageable with one side of a blade to support the same while the blade is disposed with an edge against said shoulder, means for moving said surface toward and away from said shoulder, and elements for engaging the ends of a blade seated on the shoulder and against said surface to secure the blade in position, one of said elements being movable to different positions along said shoulder.

11. A blade holder for a thin flexible blade comprising a drum having a substantially cylindrical peripheral surface for engaging the inside of a curved blade to support the same during grinding, an arm extending radially over the drum towards the periphery thereof, an element carried by the arm and disposed in overlying relation with respect to the peripheral surface of the drum, and means mounting said arm for rotative movement to carry said element around the major part of said cylindrical drum periphery.

12. A machine for forming serrations in one edge of a thin flexible blade, comprising an abrasive wheel, means for rotating the wheel, a carriage, means for reciprocating the carriage on a stroke over a work path and on a stroke over a return path, a shiftable holder on the carriage for supporting a blade and passing a portion thereof across the wheel and in contact therewith during a work stroke, a rack member secured to the holder, means for locking the holder to prevent shifting thereof with respect to the carriage during each reciprocation of the latter, a pawl engageable with the rack, a spring connected to the pawl, means for automatically shifting the pawl with respect to the rack and against the force of the spring during each reciprocation of the carriage, and means for automatically releasing the locking means at the end of each return stroke whereby the pawl shifts the holder under the influence of the spring.

13. A holder for supporting a thin flexible blade while a portion of one edge of the latter is presented to an abrader for sharpening, comprising a head member having a marginal shoulder for engaging an edge of a blade, a support member carried by the head and having a surface engageable with one side of a blade while an edge of the blade is against the shoulder, means for adjusting one of said members toward and away from the other to accommodate blades of different widths, a recess in one of the members, and a flange on the other of said members movable into and out of said recess.

14. A machine for forming serrations in a thin flexible blade comprising an abrasive wheel, means for rotating the wheel, a carriage, a holder on the carriage for supporting a blade, a lever connected to the carriage for reciprocating the same, a member movable adjacent the lever, drive means for reciprocating said member, a handle on the lever for manual actuation of the carriage, and means for connecting the lever to the member for actuation of the carriage by the drive means.

15. In a blade grinding machine, a holder comprising a head having a guide portion extending therefrom, a support spaced from the head and rigidly secured thereto, a blade backing member disposed in the space between the head and the support and having sliding engagement with the guide portion, and means for moving the backing member toward and away from the head.

16. In a blade grinding machine, a holder comprising a head having a guide portion extending therefrom, a support spaced from the head, posts extending between the head and support to secure the same in spaced relation, a blade backing member disposed in the space between the head and support and having sliding engagement with the guide portion, and means for moving the backing member toward and away from the head.

17. In a blade grinding machine, a holder comprising a head having a guide portion extending therefrom, a support spaced from the head and rigidly secured thereto, said support having a sleeve portion disposed about said guide portion in spaced relation thereto, a blade backing member disposed in the space between the head and support and having a tubular portion guided in the space between the guide portion and said sleeve portion, and means for moving the backing member toward and away from the head.

18. In a blade grinding machine, a holder comprising a head having a guide portion extending therefrom, a support spaced from the head and rigidly secured thereto, said support having a sleeve portion disposed about said guide portion in spaced relation thereto, a blade backing member disposed in the space between the head and support and having a tubular portion guided in the space between the guide portion and said sleeve portion, means for moving the backing member toward and away from the head, a ring rotatably carried by the sleeve and having an arm extending over the support, and an element on the arm for securing an end of a blade to hold the same against the backing member.

19. In a blade grinding machine, a holder comprising a head having a guide portion extending therefrom, a backing member disposed in overlying relation to the head and having a tubular portion substantially embracing the guide portion, means for holding a blade against the backing member, and means for shifting the tubular portion relative to the guide portion to move the backing member toward and away from the head, said shifting means being threadedly engaged with one of the portions and arranged to bear against the other of the portions.

20. In a blade grinding machine, a holder comprising a head having a guide portion extending therefrom, a backing member disposed in overlying relation to the head and having a tubular portion substantially embracing the guide portion, a spindle extending beyond one end of the guide portion, an adjusting wheel rotatable on the spindle for shifting the tubular portion relative to the guide portion to move the backing member toward and away from the head, said wheel being threadedly engaged with one of the portions and arranged to bear against the other of the portions, and means for holding a blade against the backing member.

21. In a blade grinding machine, a holder comprising a head having a guide portion extending therefrom, a backing member disposed in overlying relation to the head and having a tubular portion substantially embracing the guide portion, a spindle extending beyond one end of the guide portion, an adjusting wheel rotatable on the spindle for shifting the tubular portion relative to the guide portion to move the backing member toward and away from the head, said wheel being threadedly engaged with one of the portions and arranged to bear against the other of the portions, means carried by the spindle for forcing the wheel against said other of the portions to resist inadvertent rotation of the wheel, and means for holding a blade against the backing member.

22. In a blade grinding machine, a holder comprising a head having a guide portion extending therefrom, a backing member disposed in overlying relation to the head and having a tubular portion substantially embracing the guide portion, a rim on the head projecting therefrom in the direction of the backing member, a depending portion on the backing member disposed behind the head rim, means for holding a blade against the backing member, and means for shifting the tubular portion relative to the guide portion to move the backing member and the depending portion thereof toward and away from the head and rim.

23. A holder for mounting a thin flexible blade, comprising a head having a curved periphery with an upstanding rim, a guide portion extending upwardly from the central part of the head, the top surface of the head sloping generally downwardly away from said guide portion toward the rim, a backing member mounted on the guide portion of the head in overlying relation to said sloping surface and having a peripheral face generally concentric to the rim, means for holding a curved blade against said face with an edge of the blade against the rim, means for moving the backing member toward and away from the head to shift the peripheral face relative to a blade disposed thereagainst, and an aperture through the head to permit the escape of liquid from the sloping surface behind the head rim.

24. A holder for mounting a thin flexible blade, comprising a head having a curved periphery with an upstanding rim having an upwardly directed supporting portion, a backing member mounted on the head in spaced overlying relation thereto and having a peripheral face generally concentric to the rim, means for holding a curved blade against said face with an edge of the blade against the supporting portion of the rim, and an opening through the head below said blade supporting rim portion to provide egress for liquid behind the rim.

25. In a grinding machine having a carriage, a supporting spindle rotatably mounted in the carriage and having a flange in bearing relation with the carriage to resist endwise movement of the spindle relative thereto, an extension spindle co-axial with said supporting spindle, a head having a curved periphery mounted on the extension spindle, means carried by the head for securing the ends of a bent blade disposed against said periphery, means for locking the spindle in different rotative positions, and means interlocking the head and flange to prevent relative rotative movement between the head and spindle.

26. In a grinding machine having a traveling carriage movable over work and return paths, a spindle rotatably mounted on the carriage, a head having a curved periphery mounted on the spindle for rotation therewith, means for securing the ends of a bent blade disposed against said periphery, a toothed ratchet wheel on the spindle, a spindle shifting pawl supported for movement over the ratchet wheel teeth, spring means, means for advancing the pawl over said teeth during a portion of the carriage travel and against the force of said spring, a locking pawl movable to engage the ratchet wheel and lock the same against rotation during the advancing of the shifting pawl, and means for withdrawing the locking pawl during the travel of the carriage to permit rotation of the spindle and head by the shifting pawl under the influence of said spring.

27. In a grinding machine having a traveling carriage movable over work and return paths, a spindle rotatably mounted on the carriage, a head having a curved periphery mounted on the spindle for rotation therewith, means for securing the ends of a bent blade disposed against said periphery, a toothed ratchet wheel on the spindle, a spindle shifting pawl supported for movement over the ratchet wheel teeth, spring means, means for advancing the pawl over said teeth during a portion of the carriage travel and against the force of said spring, a locking pawl movable to engage the ratchet wheel and lock the same against rotation during the advancing of the shifting pawl, means for withdrawing the locking pawl during the travel of the carriage to permit rotation of the spindle and head by the shifting pawl under the influence of said spring, and stop means for limiting the amount of spindle rotating movement of the shifting pawl.

28. In a grinding machine, a rotatable spindle and a support therefor, a head having a curved periphery mounted on the spindle for rotation therewith, means for securing the ends of a bent blade disposed against said periphery, a toothed ratchet wheel on the spindle, a spindle shifting pawl supported for movement over the ratchet wheel teeth, means for reciprocating said pawl to impart intermittent rotative movements to the spindle and head, a finger carried by the spindle and arranged to intercept the pawl after a predetermined number of rotative movements and prevent further rotation of the spindle by the pawl, said finger being movable to intercept the pawl at various positions of rotation of the spindle, and means for locking the pawl in any of said various positions.

29. In a grinding machine, a rotatable spindle and a support therefor, a head having a curved periphery mounted on the spindle for rotation therewith, means for securing the ends of a bent blade disposed against said periphery, a toothed ratchet wheel on the spindle, a spindle shifting pawl supported for movement over the ratchet wheel teeth, means for reciprocating said pawl to impart intermittent rotative movements to the spindle and head, a sleeve rotatable on the spindle, a finger on the sleeve extending substantially radially therefrom to intercept the pawl and hold the same out of engagement with the ratchet wheel, and means on the spindle to engage the sleeve and lock the same against rotation on the spindle.

30. In a grinding machine having a rotatable spindle and a support therefor, a toothed ratchet wheel on the spindle, means engageable with the wheel to intermittently rotate the wheel and spindle, a blade holder comprising a head slidably received by the spindle and having a curved periphery to support a curved blade, a sleeve secured to the head and telescopically received about the spindle, and an arm carried by said sleeve and having means for securing an end of a blade disposed against said periphery, said head and arm of the holder being removable as a unit from the spindle without releasing a blade supported thereby.

31. In a grinding machine having a rotatable spindle and a support therefor, a toothed ratchet wheel on the spindle, means engageable with the wheel to intermittently rotate the wheel and spindle, a blade holder comprising a head slidably received by the spindle and having a curved periphery to support a curved blade, a sleeve secured to the head and telescopically received about the spindle, an arm carried by said sleeve and having means for securing an end of a blade disposed against said periphery, said head and arm of the holder being removable as a unit from the spindle without releasing a blade supported thereby, and means for interlocking the spindle and the blade holder to prevent relative rotation therebetween, said interlocking means being arranged to effect said interlocking connection at only a single relative rotational position of the spindle and holder.

32. In a grinding machine having a rotatable spindle and a support therefor, a toothed ratchet wheel on the spindle, a spindle shifting pawl supported for movement over the wheel teeth, means for reciprocating said pawl to impart intermittent rotative movements to the spindle, means for intercepting the pawl after a predetermined number of rotative movements and prevent further rotation of the spindle by the pawl, a blade holder comprising a head slidably received by the spindle and having a curved periphery to support a curved blade, a sleeve secured to the head and telescopically received about the spindle, an arm carried by said sleeve and having means for securing an end of a blade disposed against said periphery, said head and arm of the holder being removable as a unit from the spindle without releasing a blade supported thereby, and means for interlocking the spindle and blade holder to prevent relative rotation therebetween, said interlocking means being arranged to effect said interlocking connection at only a single relative rotational position of the spindle and holder.

33. In a grinder having a supporting structure mounting a power driven wheel and a work holder relatively movable toward and away from one another, means for effecting said movement comprising a reciprocable member pivoted on the structure and having a handle for manual actuation thereof, power actuated means supported by the structure for reciprocation adjacent the handle, and means releasably connecting the handle and said actuated means for driving the reciprocable member.

34. In a grinder having a supporting structure and a movable carriage mounted thereon, a reciprocable member connected to the carriage and having a handle for manual actuation thereof, a drive member on the structure having means for moving the same over a path paralleling the path of the reciprocable member, and means controlled by the handle for interlocking the reciprocable member with the drive member whereby the reciprocable member is actuated by the drive membr in synchronism therewith.

35. In a grinder having a supporting structure and a movable carriage mounted thereon, a reciprocable member connected to the carriage and having a handle for manual actuation thereof, a drive member on the structure having means for moving the same over a path paralleling the path of the reciprocable member, a recess in the drive member, and a pin slidably mounted on the reciprocable member and movable into the recess to drivingly connect the members.

36. In a grinder having a supporting structure and a movable carriage mounted thereon, a reciprocable member connected to the carriage and having a handle for manual actuation thereof, a drive member on the structure having means for moving the same over a path paralleling the path of the reciprocable member, a recess in the drive member, and a pin slidably mounted on the reciprocable member, said handle being shiftable on the reciprocable member and having connection with the pin to move the latter into the recess and drivingly connect the members.

37. In a grinder having a supporting structure and a movable carriage mounted thereon, a pivot on the structure, a drive member on the pivot and means for actuating the same over an arcuate path about the pivot, a reciprocable member on the pivot and having connection with the carriage to actuate the latter, a recess in one of the members, and a pin in the other of the members receivable in said recess to drivingly connect the members.

38. In a grinder having a supporting structure and a movable carriage mounted thereon, a pivot on the structure, a drive member on the pivot and means for actuating the same over an arcuate path about the pivot, a reciprocable member on the pivot and having connection with the carriage to actuate the latter, a recess in one of the members, a pin in the other of the members receivable in said recess to drivingly connect the members, and a track on the member having the recess to engage the pin and guide the same to the recess.

39. In a grinder having a supporting structure and a movable carriage mounted thereon, drive and driven members mounted on the structure for arcuate movement about a common pivot axis, means connecting the driven member and the carriage, and means for coupling the members for synchronous movement, said coupling means including a socket in one of the members and a retractable pin carried by the other of the members and receivable in the socket.

40. A holder for supporting a thin flexible blade during grinding thereof, comprising a head member and a backing member each having an arcuate periphery for engaging and supporting a blade, means for supporting the members with their peripheries in generally spaced parallel relation, means for moving one of the members toward and away from the other to vary the space between the peripheries, and attaching means for engaging one end of a blade to hold the same in arcuate form against the peripheries of said members, said attaching means being movable along the periphery of the backing member to adjust the holder for blades of different length.

41. A holder for supporting a thin flexible blade during grinding thereof, comprising a head member and a backing member each having an arcuate periphery for engaging and supporting a blade, means for supporting the members with their peripheries in generally spaced parallel relation, means for moving one of the members toward and away from the other to vary the space between the peripheries, and attaching means supported for adjusting movement along the periphery of the backing member and having an element engageable with one end of a blade to hold the same in arcuate form against the peripheries of the members, said element being movable toward and away from the head member to accommodate blades of different widths.

42. In a blade grinding machine, an electric motor having a projecting journal at one end and a shaft rotatable therein, a grinding wheel on the shaft, a hood disposed about the wheel and having an opening for the shaft, means for supplying liquid coolant to the wheel, a ring on the shaft for rotation therewith, said ring having a narrow periphery spaced from the edges of the opening and disposed on the wheel side of the opening whereby coolant on the rotating ring is thrown tangentially from the periphery thereof by centrifugal force across the opening and into the interior of the hood beyond the edges of the opening, and a recess in one side of the ring to receive the end of the projecting motor journal.

43. In a blade grinding machine, an electric motor having a shaft rotatable therein, a grinding wheel on the shaft, a hood disposed about the wheel and having an opening for the shaft, means for supplying liquid coolant to the wheel, and a ring on the shaft for rotation therewith, said ring having a narrow periphery spaced from the edges of the opening and disposed on the wheel side of the opening whereby coolant on the rotating ring is thrown tangentially from the periphery thereof by centrifugal force across the opening and into the interior of the hood beyond the edges of the opening.

44. In a blade grinding machine having a grinding wheel and a spindle movable relative to one another, a blade holder mounted on the spindle and having an arcuate blade supporting periphery, means releasably securing the holder on the spindle for facile removal therefrom, and means secured to the holder and having at least one element movable along the periphery of the holder to engage and secure the ends of a blade and hold the latter against said arcuate periphery, said last named means being removable from the spindle as a unit with the holder and having means connecting the same to the holder for retaining the parts in fixed relation when removed from the spindle to provide for attachment of a blade to a removed holder.

45. In a blade grinding machine having a grinding wheel and a spindle movable relative to one another, a blade holder mounted on the spindle and having an extension sleeve embracing the latter, an arcuate periphery on the holder for supporting a blade to be presented to the wheel in curved shape, means releasably securing the holder on the spindle for facile removal therefrom, a member rotatable on the sleeve and having an arm reaching to the periphery, an element on the arm at the periphery to engage a blade and hold the latter against the periphery, and means cooperable with the sleeve for locking the member in fixed relation to the holder, said holder and the member being removable as a unit from the spindle to provide for attachment and detachment of blades from a removed holder.

46. In a blade grinding machine having a grinding wheel and a spindle movable relative to one another, a blade holder mounted on the spindle and having an extension sleeve embracing the latter, an arcuate periphery on the holder for supporting a blade to be presented to the wheel in curved shape, means releasably securing the holder on the spindle for facile removal therefrom, a pair of rings swingably mounted on the sleeve and each having an arm extending to the periphery of the holder, elements on the arms at the periphery to engage a blade and hold the latter against the periphery in bent shape, means for holding the rings on the sleeve so that the rings with their arms and the holder are removable as a unit from the spindle, and means for fastening the rings and arms with the elements in different positions along the periphery of the holder to adjust the latter to receive blades of different lengths.

47. In a grinding machine having a carriage and a grinding wheel, a supporting spindle rotatably mounted in the carriage and having a flange in bearing relation with the carriage to resist endwise movement of the spindle relative thereto, means for reciprocating the carriage at right angles to the rotational axis of the spindle to move the same to and from the grinding wheel, stop means to limit the rotative movement of the spindle relative to the carriage, an extension spindle co-axial with said supporting spindle, a head having a curved periphery mounted on the extension spindle, means carried by the head for securing the ends of a bent blade disposed against said periphery, a ratchet wheel and a pawl engageable therewith for locking the spindle in different rotative positions, said wheel being secured on the spindle in confronting relation to the flange and with the carriage interposed therebetween, means for shifting the spindle and head during each reciprocation of the carriage to present different portions of a blade supported thereby to the wheel, and means slidably interlocking the head and flange to prevent relative rotative movement between the head and spindle while permitting facile removal of the head from the spindle.

ARTHUR A. KOTTMANN.